(12) United States Patent
Iwata et al.

(10) Patent No.: US 12,278,499 B2
(45) Date of Patent: Apr. 15, 2025

(54) NONCONTACT POWER SUPPLY DEVICE

(71) Applicant: TOYOTA JIDOSHA KABUSHIKI KAISHA, Toyota (JP)

(72) Inventors: Naoki Iwata, Kasugai (JP); Osamu Yamashita, Toyota (JP); Shinjiro Saigusa, Toyota (JP); Toshiya Hashimoto, Miyoshi (JP); Katsuya Kobayashi, Okazaki (JP); Sungmin Cho, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 18/371,484

(22) Filed: Sep. 22, 2023

(65) Prior Publication Data
US 2024/0120773 A1 Apr. 11, 2024

(30) Foreign Application Priority Data
Oct. 5, 2022 (JP) .................... 2022-161235

(51) Int. Cl.
*H02J 50/10* (2016.01)
*H02J 50/00* (2016.01)
*H02J 50/40* (2016.01)

(52) U.S. Cl.
CPC ............ *H02J 50/10* (2016.02); *H02J 50/005* (2020.01); *H02J 50/40* (2016.02)

(58) Field of Classification Search
CPC ........... H02J 50/10; H02J 50/40; H02J 50/005
USPC ......................................................... 307/104
See application file for complete search history.

(56) References Cited

U.S. PATENT DOCUMENTS

| | | | | |
|---|---|---|---|---|
| 5,734,254 A | * | 3/1998 | Stephens | H02J 50/90 |
| | | | | D13/107 |
| 2007/0182367 A1 | * | 8/2007 | Partovi | H02J 50/12 |
| | | | | 320/108 |
| 2018/0069601 A1 | * | 3/2018 | Qiu | H02J 50/70 |
| 2020/0076242 A1 | * | 3/2020 | Narayana Bhat | H02J 7/00034 |
| 2021/0184497 A1 | * | 6/2021 | Lai | H01F 27/327 |
| 2021/0234405 A1 | | 7/2021 | Yonezawa | |
| 2022/0115896 A1 | * | 4/2022 | Cook | H02J 7/04 |

FOREIGN PATENT DOCUMENTS

| | | |
|---|---|---|
| JP | 2014-217171 A | 11/2014 |
| JP | 2015-216357 A | 12/2015 |
| JP | 6145318 B2 | 6/2017 |
| JP | 2021-118649 A | 8/2021 |

* cited by examiner

*Primary Examiner* — Alfonso Perez Borroto
(74) *Attorney, Agent, or Firm* — Dinsmore & Shohl LLP

(57) ABSTRACT

A noncontact power supply device provided with one or more coil units and a cover housing the coil units inside of it. The cover is formed by joining a first sheet arranged at one surface sides of front and back surfaces of the coil units and a second sheet arranged at the other surface sides, the first sheet is a sheet covering the one surface sides of the coil units, the second sheet is a sheet having another surface part covering the other surface sides of the coil units and side surface parts covering side surfaces, the side surface parts of the second sheet are made to abut against side surfaces of the coil units by bending boundaries with the other surface part, and outer edge parts of the side surface parts of the second sheet and outer edge parts of the first sheet are joined.

4 Claims, 3 Drawing Sheets

NONCONTACT POWER SUPPLY DEVICE

CROSS-REFERENCE TO RELATED APPLICATION

This application claims priority to Japanese Patent Application No. 2022-161235 filed on Oct. 5, 2022, the entire contents of which are herein incorporated by reference.

FIELD

The present disclosure relates to a noncontact power supply device.

BACKGROUND

Japanese Patent No. 6145318 discloses a conventional noncontact power supply device in which two sheet materials larger than a power transmission coil are used to sandwich the power transmission coil, and the sheet materials and the sheet materials and power transmission coil are joined using an adhesive etc.

SUMMARY

In the above-mentioned conventional noncontact power supply device, it is necessary to use an adhesive to fasten the power transmission coil to the sheet materials. For this reason, both the number of manufacturing processes and the manufacturing costs were liable to increase.

The present disclosure was made focusing on such a problem and has as its object the provision of a noncontact power supply device of a structure having a coil unit having a coil for transmitting electric power to a power consuming object by noncontact sandwiched between sheet materials in which both of the number of manufacturing processes and the manufacturing costs are kept down while the position of the coil unit can be fastened inside of the sheet material (cover).

To solve this problem, a noncontact power supply device according to one aspect of the present disclosure is comprised of one or more coil units each having a coil for transmitting electric power to a power consuming object by noncontact and a cover housing the coil units inside it. The cover is formed by joining a first sheet arranged at one surface sides of front and back surfaces of the coil units and a second sheet arranged at the other surface sides. The first sheet is a sheet covering the one surface sides of the coil units. The second sheet is a sheet having another surface part covering the other surface sides of the coil units and side surface parts covering the side surfaces. The side surface parts of the second sheet are made to abut against side surfaces of the coil units by bending them up at boundaries with the other surface part. Outer edge parts of the side surface parts of the second sheet and outer edge parts of the first sheet are joined.

According to this aspect of the present disclosure, when housing coil units inside of the cover, it is possible to make the side surface parts of the second sheet abut against the side surfaces of the coil units, so it is possible to prevent clearances from being formed between the coil units and the cover. For this reason, even without fastening the coil units to the cover, it is possible to prevent the positions of the coil units from deviating inside of the cover and possible to eliminate the trouble of fastening the coil units to the cover, so it is possible to keep down one or both of the number of manufacturing processes and manufacturing costs of the power supply mat.

DESCRIPTION OF EMBODIMENTS

Figure 1:
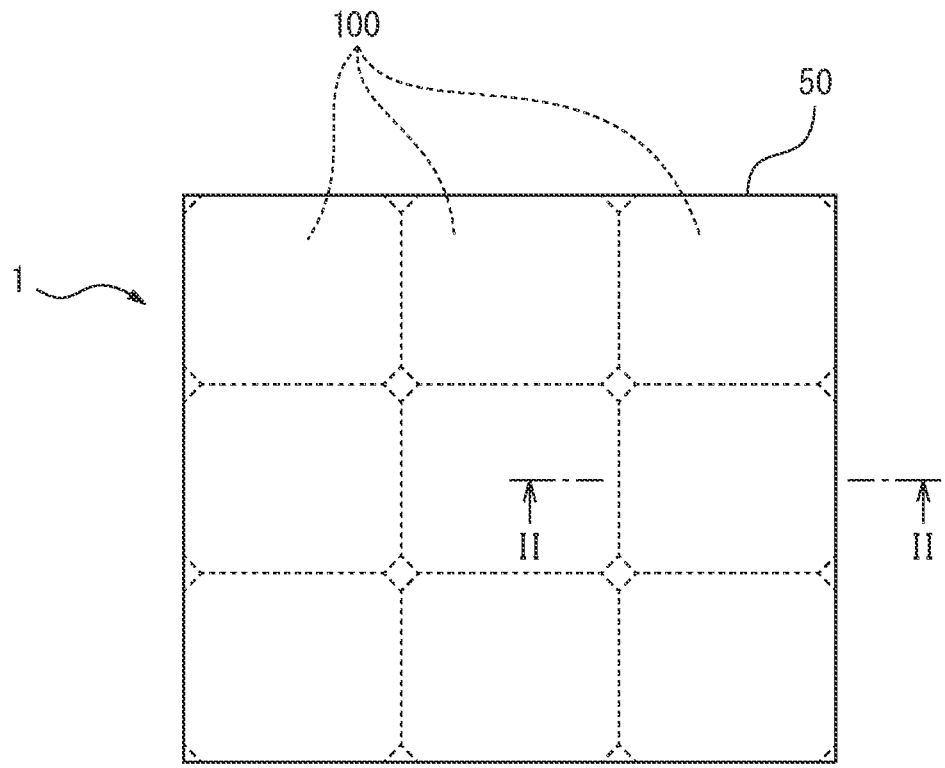
FIG. 1 is a schematic plan view of a power supply mat according to a first embodiment of the present disclosure.

Below, referring to the drawings, embodiments will be explained in detail. Note that, in the following explanation, similar component elements will be assigned the same reference notations.

FIG. 1 is a schematic plan view of a power supply mat 1 (noncontact power supply device) according to a first embodiment of the present disclosure.

The power supply mat 1 is provided with one or more power transmission coil units 100 and a cover 50 for housing and protecting the power transmission coil units 100 at its inside. For example, it is set at an event site, evacuation site, or other location where usually noncontact power supply is not possible and supplies power by noncontact to the power consuming object used in that location. The power consuming object is not limited in type and may be a vehicle, drone, or other moving object and may be a communication device, household electric appliance, etc.

In the example shown in FIG. 1, a group of power transmission coil units comprised of nine power transmission coil units 100 physically and electrically connected is housed at the inside of one cover 50. The power supply mat 1 is configured to be able to be connected through a power cord (not shown) to an outside AC power supply or other power supply. The electric power supplied from the power supply is supplied to the individual power transmission coil units 100.

Figure 2:
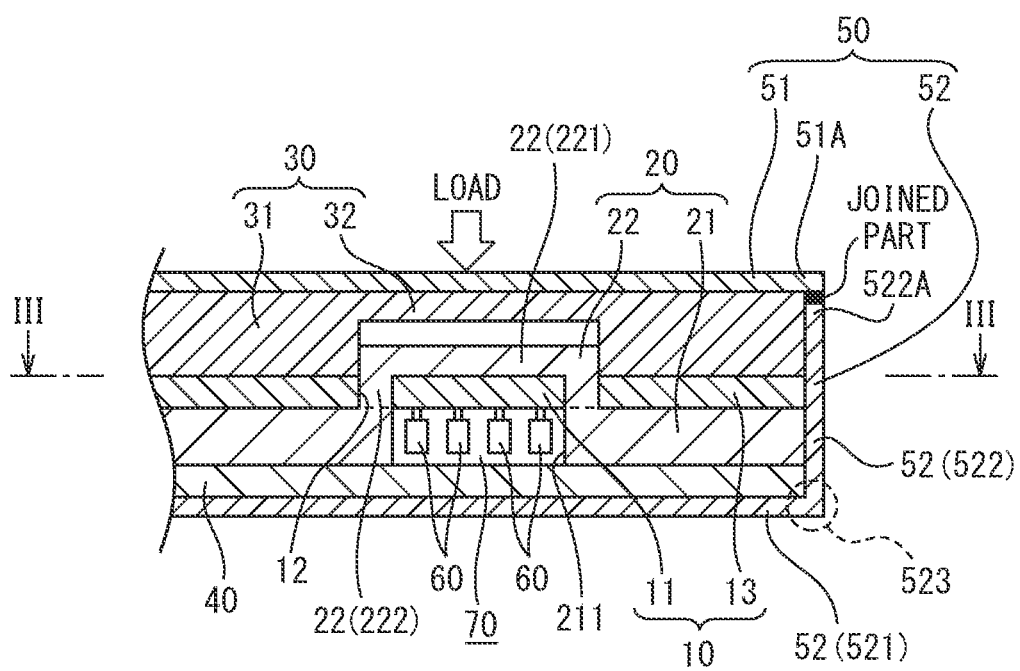
FIG. 2 is a schematic cross-sectional view of the power supply mat along the line II-II of FIG. 1.
Figure 3:
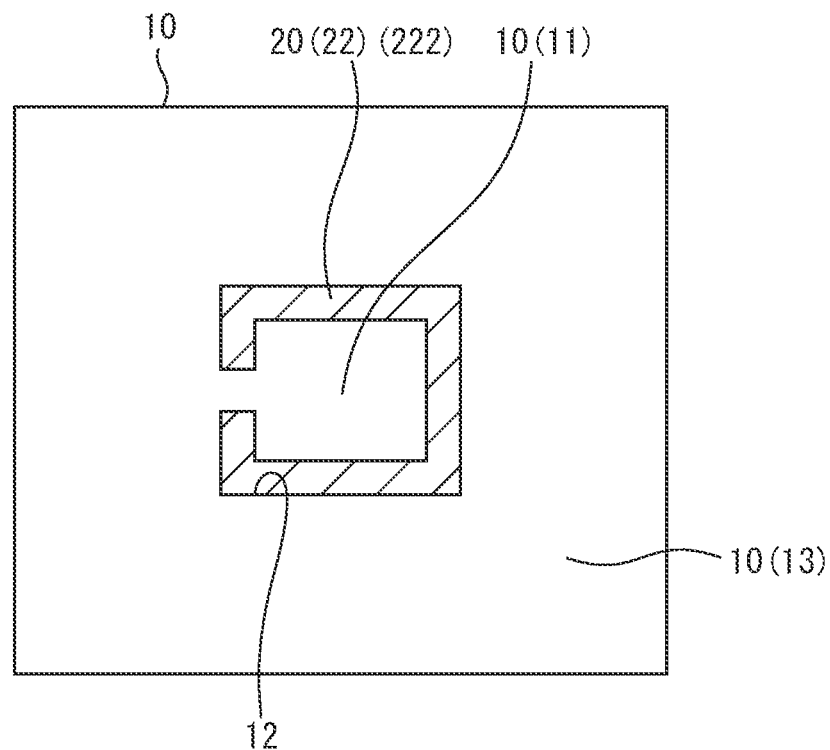
FIG. 3 is a schematic cross-sectional view of a power transmission coil unit along the line III-III of FIG. 2.

FIG. 2 is a schematic cross-sectional view of the power supply mat 1 along the line II-II of FIG. 1. FIG. 3 is a schematic cross-sectional view of a power transmission coil unit 100 along the line III-III of FIG. 2.

Below, referring to FIG. 2 and FIG. 3, details of each power transmission coil unit 100 will be explained. Note that, the configuration of the power transmission coil unit 100 explained with reference to FIG. 2 and FIG. 3 is just one example. The configuration is not particularly limited so long as one able to transmit electrical power supplied from a power supply to a power consuming object.

The power transmission coil unit 100 is made a thin flat shape so as to enable a vehicle to easily ride up over it. For example, as shown in FIG. 2 and FIG. 3, it is provided with a printed coil board 10, a core 20, a spacer 30, and an electromagnetic shield 40.

The printed coil board 10 is for example a hard printed circuit board on the surface etc. of which a power transmission coil (not shown) comprised of a conductor pattern is formed. At the back surface side of the center part of the printed coil board 10, for example capacitors 60 and other electronic devices are attached by soldering etc. The power transmission coil formed on the printed coil board 10 forms a resonance circuit together with the capacitors 60 attached to the printed coil board 10 and transmits power by noncontact by magnetic resonance coupling (magnetic resonance) to a power consuming object placed on the power transmission coil unit 100.

As shown in FIG. 3, in the printed coil board 10, at the back surface side, if referring to the region at the center part where the capacitors 60 and other electronic components are attached as the "component mounting part 11", the printed coil board 10 is formed with a C-shaped groove like core engaging hole 12 for engaging with (inserting) a projecting part 222 of a top core 22 of the core 20 explained later so as to surround the vicinity of the component mounting part 11. Further, at the region outside of this core engaging hole 12 (below, referred to as a "coil forming part") 13, a circular or rectangular power transmission coil comprised of a conductor pattern is formed so as to surround the vicinity of the core engaging hole 12.

The core 20 is provided with a bottom core 21 and a top core 22 comprised of ferrite or other magnetic materials.

The bottom core 21 is a flat sheet shaped member with a hole 211 formed at its center part and is arranged on a back surface side of the printed coil board 10. The hole 211 of the bottom core 21 functions as a component holding space 70 in which capacitors 60 and other electronic components attached to the printed coil board 10 are held when the electromagnetic shield 40 is arranged on the back surface of the bottom core 21.

The top core 22 is provided with a flat sheet shaped peak part 221 covering the front surface of the component mounting part 11 of the printed coil board 10 and a projecting part 222 projecting out from the peak part 221 downward and engaged with the core engaging hole 12 of the printed coil board. In the present embodiment, the back surface of the peak part 221 of the top core 22 abuts against the component mounting part 11 of the printed coil board 10.

The spacer 30 is a plastic member for making the front surface of the power transmission coil unit 100 flat and protecting the printed coil board 10 and core 20 from a load applied to the power transmission coil unit 100. The spacer 30 according to the present embodiment is provided with a thick wall part 31 arranged at the coil forming part 13 of the printed coil board 10 and adhered to its front surface and a thin wall part 32 positioned at a location facing the component mounting part 11 of the printed coil board 10 when arranging the thick wall part 31 at the coil forming part 13.

The electromagnetic shield 40 is a flat sheet shaped member comprised of a highly conductive metal material (for example, aluminum or copper). The electromagnetic shield 40 is arranged overall at the back surface side of the bottom core 21 and cancels out the magnetic lines of force by an eddy current so reduces the magnetic field leaking to the back side of the power supply mat 1.

The cover 50 is formed by joining the outer edge parts 51A and 522A of the two sheets of the first sheet 51 and the second sheet 52. The method of joining the first sheet 51 and the second sheet 52 is not particularly limited. The outer edge parts 51A and 522A of these may be joined by melt bonding or may be joined by an adhesive, adhesive tape, etc.

The first sheet 51 according to the present embodiment is a rectangular shape sheet covering the front surfaces of the group of power transmission coil units comprised of nine power transmission coil units 100 and has an area substantially equal to the areas of the front surfaces of the group of power transmission coil units.

The second sheet 52 according to the present embodiment is a sheet comprised of a back surface part 521 covering the back surfaces of the group of power transmission coil units comprised of nine power transmission coil units 100 and side surface parts 522 covering the side surfaces joined together. The boundaries 523 between the back surface part 521 and the side surface parts 522 can be bent inward so as to make the side surface parts 522 stand substantially vertically.

The back surface part 521 of the second sheet 52 has an area substantially equal to the areas of the back surfaces of the group of power transmission coil units. Therefore, in the present embodiment, the area of the back surface part 521 of the second sheet 52 is equal to the area of the first sheet 51.

Further, the widths of the side surface parts 522 of the second sheet 52, that is, the heights when making the side surface parts 522 stand vertically, are made substantially equal to the thickness of the power transmission coil unit 100. Further, in the present embodiment, the outer edge parts 522A of the side surface parts 522 of the second sheet 52 made to stand vertically are joined with the outer edge parts 51A of the first sheet 51.

Figure 6:
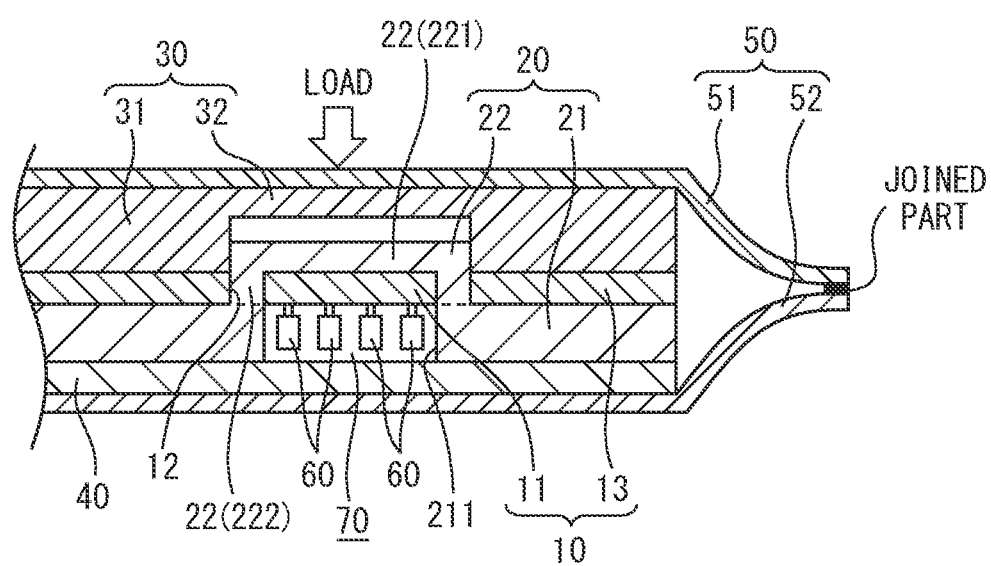
FIG. 6 is a schematic cross-sectional view of a power supply mat of a comparative example different from the present disclosure.

Due to this, for example, compared to the case as in the comparative example shown in FIG. 6 where the second sheet 52 is not provided with the side surface parts 522 and the first sheet 51 and the second sheet 52 are respectively made rectangular sheets somewhat larger than the group of power transmission coil units and their outer edge parts are joined together, in the present embodiment, as shown in FIG. 2, the side surface parts 522 of the second sheet 52 can be made to abut against the side surfaces of the group of power transmission coil units, so a clearance can be prevented from forming between the group of power transmission coil units and the cover 50.

For this reason, even without fastening the power transmission coil units 100 to the cover 50, it is possible to keep the positions of the power transmission coil units 100 from deviating. Due to this, for example, it is possible to prevent the physical or electrical connections among the power transmission coil units 100 from ending up being cut due to positional deviation of some of the power transmission coil units 100.

Further, by preventing a clearance from forming between the group of power transmission coil units and the cover 50, for example, if electrically connecting a plurality of the power supply mats 1, it is possible to keep the distance between the power supply mats 1 from increasing.

Note that, in the present embodiment, the second sheet 52 arranged at the back surface sides of the power transmission coil units 100 was provided with the side surface parts 522, but the first sheet 51 arranged at the front surface side may also be provided with the side surface parts.

The power supply mat 1 (noncontact power supply device) according to the present embodiment explained above is provided with one or more power transmission coil units 100 (coil units) for transmitting electric power to power consuming objects by noncontact and a cover 50 for housing one or more power transmission coil units 100 inside it.

The cover 50 is formed by joining a first sheet 51 arranged at the front surface sides (one surface sides of front and back surfaces) of the power transmission coil units 100 and a second sheet 52 arranged at the back surface sides (other surface sides of front and back surfaces) joined together. The first sheet 51 is a sheet covering the front surface sides of the power transmission coil units 100 while the second sheet 52 is a sheet having a back surface part 521 (other surface part) covering the back surface sides of the power transmission coil units 100 and side surface parts 522 covering the side surfaces. Further, the side surface parts 522 of the second sheet 52 are bent at the boundaries 523 with the back surface part 521 to make them abut against the side surfaces of the power transmission coil units 10. The outer edge parts 522A of the side surface parts 522 of the second sheet 52 and the outer edge parts 51A of the first sheet 51 are joined.

In this way, according to the present embodiment, when housing the power transmission coil units 100 at the inside of the cover 50, the side surface parts 522 of the second sheet 52 can be made to abut against the side surfaces of the power transmission coil units 10, so it is possible to prevent clearances from forming between the power transmission coil units 100 and the cover 50. For this reason, even without fastening the power transmission coil units 100 to the cover 50, it is possible to prevent the positions of the power transmission coil units 100 from deviating.

Therefore, it is possible to prevent the positions of the power transmission coil units 100 from deviating while eliminating the trouble of fastening the power transmission coil units 100 to the cover 50, so one or both of the number of manufacturing processes and the manufacturing costs of the power supply mat 1 can be kept down. Further, for example, it is possible to prevent the physical or electrical connections among the power transmission coil units 100 from ending up being cut due to positional deviation of some of the power transmission coil units 100.

Second Embodiment

Next, a second embodiment of the present disclosure will be explained. The present embodiment differs from the first embodiment on the point of providing joined locations of the first sheet 51 and the second sheet 52 at other than the outer edge parts. Below, the explanation will be given focusing on the point of difference.

Figure 4:
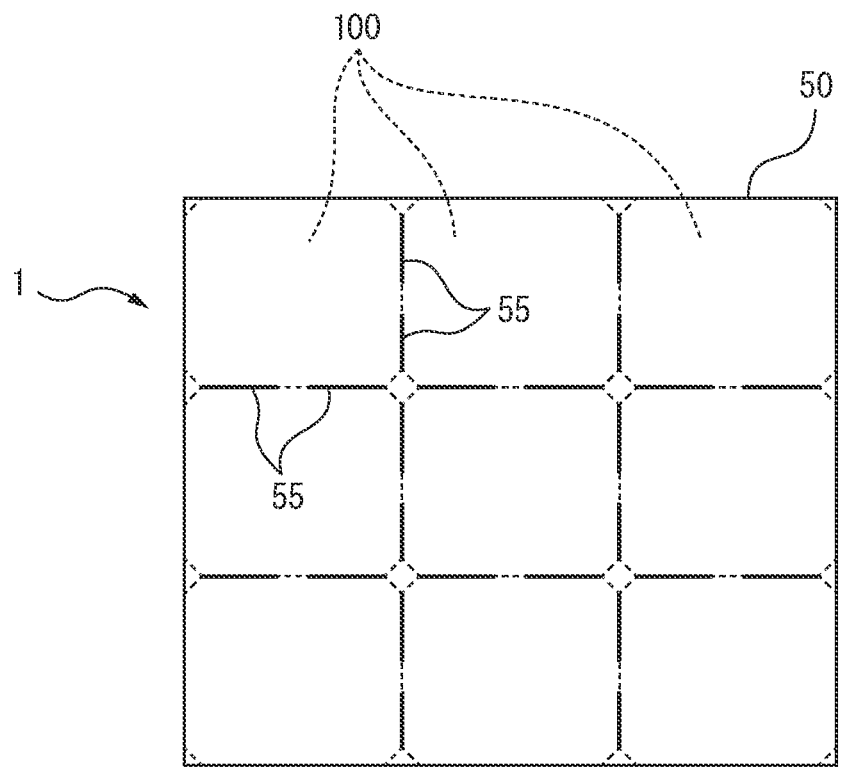
FIG. 4 is a schematic plan view of a power supply mat according to a second embodiment of the present disclosure.

FIG. 4 is a schematic plan view of the power supply mat 1 according to the present embodiment.

As shown in FIG. 4, in the present embodiment, the first sheet 51 and the second sheet 52 are further joined between the adjoining power transmission coil units 100 in line shapes. In the example shown in FIG. 4, two each line shaped joined parts 55 are formed in the vertical and horizontal directions. Due to this, it becomes easier to bend the power supply mat 1 about the line shaped joined parts 55, so it is possible to improve the flexibility of the power supply mat 1.

Third Embodiment

Next, a third embodiment of the present disclosure will be explained. The present embodiment differs from the first embodiment on the point of providing joined locations of the first sheet 51 and the second sheet 52 other than the outer edge parts. Below, the explanation will be given focusing on the point of difference.

Figure 5:
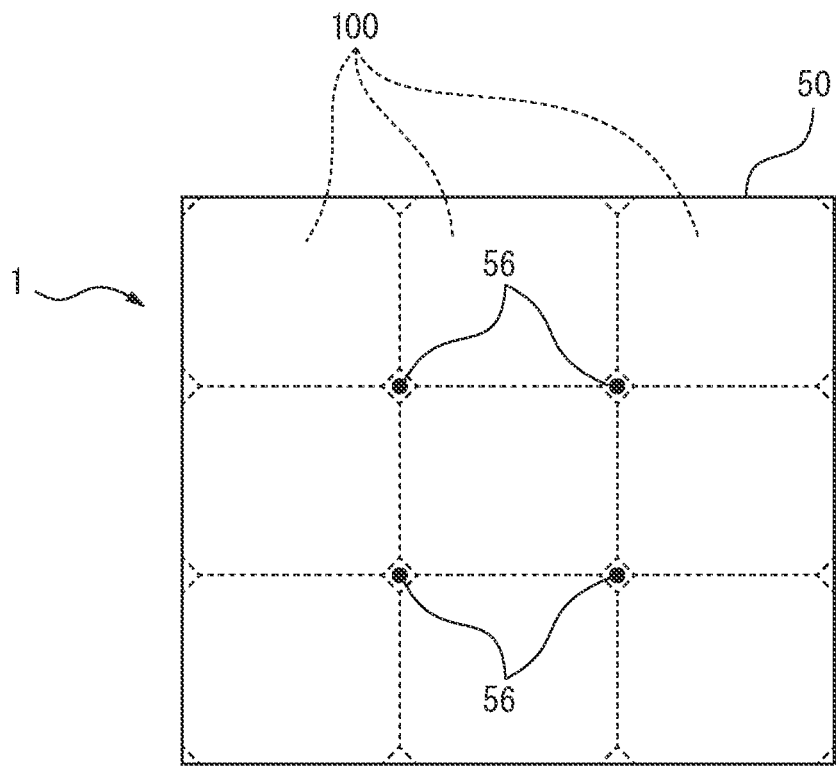
FIG. 5 is a schematic plan view of a power supply mat according to a third embodiment of the present disclosure.

FIG. 5 is a schematic plan view of the power supply mat 1 according to the present embodiment.

As shown in FIG. 5, in the present embodiment, the first sheet 51 and the second sheet 52 are further joined in point shapes at the locations where the corner parts of the four power transmission coil units overlap. In the example shown in FIG. 5, a total of four point shaped joined parts 56 are formed. Due to this, the point shaped joined parts 56 function as stoppers preventing the power transmission coil units 100 from deviating in position inside the cover 50, so even without fastening the power transmission coil units to the cover 50, it is possible to effectively prevent the power transmission coil units from deviating in position.

Further, like in the above-mentioned second embodiment, it is possible to reduce the clearance between adjoining power transmission coil units 100 by exactly the amount of the linear joining parts 55 not formed compared with when forming the linear joining parts 55 (the power transmission coil unit 100 and the power transmission coil unit 100 can be made to closely contact each other). For this reason, the power supply mat 1 can be made smaller in size. Further, if the clearances between the power transmission coil units 100 were to become greater, the power transmission efficiency would fall, so the power transmission efficiency can be kept from falling.

Above, embodiments of the present disclosure were explained, but the embodiments only shown some of the applications of the present disclosure and are not intended to limit the technical scope of the present disclosure the specific constitutions of the embodiments.

For example, in the above embodiments, the power transmission coil unit 100 had an electromagnetic shield 40, but instead of this, for example, vapor deposition etc. may be used to coat the inside surface of the back surface side 521 of the second sheet 52 with a coating highly conductive metal material (for example, aluminum or copper) functioning as an electromagnetic shield.

The invention claimed is:

1. A noncontact power supply device comprising:
one or more coil units configured to transmit electric power to a power consuming object by noncontact; and
a cover configured to house the coil units inside it, wherein
the cover is formed by joining a first sheet arranged at one surface sides of front and back surfaces of the coil units and a second sheet arranged at the other surface sides,
the first sheet is a sheet covering the one surface sides of the coil units,
the second sheet is a sheet having another surface part covering the other surface sides of the coil units and side surface parts covering the side surfaces,
the side surface part of the second sheet is made to abut against side surfaces of the coil units by bending up boundaries with the other surface part, and
outer edge parts of the side surface parts of the second sheet and outer edge parts of the first sheet are joined.

2. The noncontact power supply device according to claim 1, wherein
the cover houses a plurality of coil units at its inside, and
the first sheet and the second sheet are further joined in line shapes between the coil units.

3. The noncontact power supply device according to claim 1, wherein
the cover houses four or more coil units at its inside, and
the first sheet and the second sheet are further joined in point shapes at the locations where the corner parts of the four coil units overlap.

4. The noncontact power supply device according to claim 1, wherein
the inside surface of the cover arranged at the back surface sides of the coil units is coated with metal material.

* * * * *